(12) United States Patent
Simon (10) Patent No.: US 8,577,104 B2
(45) Date of Patent: Nov. 5, 2013

(54) LIVER LESION SEGMENTATION

(75) Inventor: Richard A. Simon, Rochester, NY (US)

(73) Assignee: Carestream Health, Inc., Rochester, NY (US)

(*) Notice: Subject to any disclaimer, the term of this patent is extended or adjusted under 35 U.S.C. 154(b) by 502 days.

(21) Appl. No.: 12/823,346

(22) Filed: Jun. 25, 2010

(65) Prior Publication Data

US 2011/0317888 A1  Dec. 29, 2011

(51) Int. Cl.
*G06K 9/00* (2006.01)
(52) U.S. Cl.
USPC .......................................... 382/128; 382/130
(58) Field of Classification Search
USPC .......................................................... 382/128
See application file for complete search history.

(56) References Cited

U.S. PATENT DOCUMENTS

| | | | | |
|---|---|---|---|---|
| 5,343,390 | A * | 8/1994 | Doi et al. | 382/132 |
| 6,556,696 | B1 | 4/2003 | Summers et al. | 382/128 |
| 7,088,850 | B2 * | 8/2006 | Wei et al. | 382/128 |
| 8,090,169 | B2 * | 1/2012 | Ioannou et al. | 382/128 |
| 2008/0118136 | A1 | 5/2008 | Cai et al. | 382/131 |
| 2009/0208055 | A1 * | 8/2009 | Chin et al. | 382/103 |
| 2009/0279754 | A1 | 11/2009 | Gindele et al. | 382/128 |

OTHER PUBLICATIONS

H. Ling, et. al. in "Hierarchial, Learning-based Automatic Liver Segmentation" in IEEE Computer Society *Conference on Computer Vision and Pattern Recognition* (*CVPR*), Anchorage, Alaska, Jun. 2008.
M.Tarron, et. al., "Border detection on short axis echocardiographic views using an ellipse driven region-based framework," (*MICCAI2004*), 2004.
Bresson et al. in an article entitled "Fast global minimization of the active contour/snake model", *Journal of Mathematical Imaging and Vision*, vol. 28, No. 2, pp. 151-167, 2007.

* cited by examiner

*Primary Examiner* — Hiep V Nguyen (57) ABSTRACT

A method for segmenting a first object from a bounding object within a digital image identifies pixels between first and second endpoint pixels. A volume of interest is defined spanning at least a portion of the object. Pixels within the volume of interest are partitioned into a first subset of pixels that are neither the first object nor bounding object pixels and second subset of pixels that are not contained in the first subset. A spatially varying two-phase segmentation process segments the first object from the bounding object within the second subset of pixels according to the location of each subject pixel within the second subset relative to pixels in the first subset of pixels. The first object segmentation is refined according to the subject pixel location relative to the segmented bounding object and to the first subset of pixels. A segmented image is formed according to the refined segmentation.

23 Claims, 9 Drawing Sheets

FIG. 9

LIVER LESION SEGMENTATION

FIELD OF THE INVENTION

The invention relates generally to the field of diagnostic imaging and more particularly relates to a method for assisted segmentation of liver tumors, particularly in computed tomography images.

BACKGROUND OF THE INVENTION

Identification of potentially cancerous lesions in computed tomography (CT) and magnetic resonance imaging (MRI) studies is a common task of radiologists. An aspect of this task relates to measurement of lesion volume and density, both important in assessing the temporal response of a tumor to treatment.

RECIST (Response Evaluation Criteria In Solid Tumors) is a set of published rules that define when cancer patients improve ("respond"), stay the same ("stable") or worsen ("progression") during treatments. Typically, a uni-dimensional measurement, RECIST criteria, which relates to the longest diameter of the tumor, is used as a type of surrogate for 3D volume measurement. These linear measurements, obtained from manual radiologist mark-up, are of some value but are generally not sufficient for accurately tracking the volume change of irregularly shaped tumors. A more accurate volumetric measurement requires the radiologist to manually segment the tumor. This process is a tedious, time-consuming task and is often poorly suited to the overall workflow requirements of the radiologist. In addition, the results of manual segmentation can be highly dependent upon the observer and are often not reproducible. Therefore, there is a need to automate the manual tasks performed by the radiologist in order to improve the workflow and to resolve inter- and intra-observer variability.

Unenhanced CT images are generally insufficient for detection of lesions because there is very little difference in attenuation values between the lesion and parenchyma, or surrounding tissue, in the liver. Lesion-to-liver contrast can be greatly improved by the use of contrast agents. Routinely, multiphase (precontrast, arterial, portal, and delayed), contrast-enhanced series are performed to facilitate the detection and characterization of liver lesions.

Once detected, segmentation of liver lesions is a challenging task because of the large variability of intensity values, in Hounsfield units (HU), between the lesion and parenchyma in the liver. The perceived density of the lesion and parenchyma are dependent upon factors such as the tumor type, contrast agent, contrast timing, and patient physiology. Compared to the surrounding parenchyma, lesions can be either hyperdense (brighter, at a higher intensity value) or hypodense (darker, at a lower intensity value).

A number of methods have been proposed for automating the process of segmenting liver lesions in CT images. A number of proposed techniques utilize a combination of a classification step, utilizing a priori information, followed by a deformable surface evolution technique, such as the active contour model. Constrained, seeded, region-growing techniques are also another common method used for segmenting liver lesions. Typically, features are generated from a number of seed points, and the initial region is iteratively grown by incorporating neighboring voxels that have similar features. The resulting tumor segmentation is often refined further by applying a postprocessing step to the binary segmentation results via morphological operations.

While existing methods for liver lesion segmentation have achieved a measure of success, there remains considerable room for improvement. One persistent problem, due to the properties of the parenchyma and surrounding tissues within and outside of the liver, relates to leakage, a segmentation phenomenon in which the boundaries of an identified lesion may not be clearly distinguishable from nearby tissues, causing the segmentation algorithm to mistakenly categorize non-lesion tissue as belonging to the lesion.

Thus, it is seen that there is a need for segmentation techniques that allow more accurate identification of the lesion boundaries in 3-D volume images.

SUMMARY OF THE INVENTION

An object of the present invention is to provide a method for improved segmentation of lesions of the liver and similar organs. The method of the present invention is semi-automatic, segmenting a lesion according to initial input from the radiologist. Measures are taken to improve segmentation performance and to reduce the likelihood of segmentation leakage.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for segmenting a first object from a bounding object within a digital image, the method comprising: identifying, from within the digital image, a plurality of pixels between at least a first endpoint pixel and a second endpoint pixel, wherein the first and second endpoint pixels are identified by a user; defining a volume of interest spanning at least a portion of the object according to the identified plurality of pixels; partitioning pixels within the volume of interest into a first subset of pixels that are neither the first object nor bounding object pixels and second subset of pixels that are not contained in the first subset; executing a spatially varying two-phase segmentation process that segments the first object from the bounding object within the second subset of pixels according to the location of each subject pixel within the second subset relative to pixels in the first subset of pixels; refining the first object segmentation according to the location of the subject pixel relative to the segmented bounding object and to the first subset of pixels; and forming a segmented image according to the refined first object segmentation.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

The following is a detailed description of the preferred embodiments of the invention, reference being made to the drawings in which the same reference numerals identify the same elements of structure in each of the several figures.

In typical applications, a computer or other type of general-purpose or dedicated logic processor is used for obtaining, processing, and storing image data as part of the CT system, along with one or more displays for viewing image results. A computer-accessible memory is also provided, which may be a non-volatile memory storage device used for longer term storage, such as a device using magnetic, optical, or other data storage media. In addition, the computer-accessible memory can comprise an electronic memory such as a random access memory (RAM) that is volatile, used for shorter term storage, such as employed to store a computer program having instructions for controlling one or more computers to practice the method according to the present invention or employed as an image buffer to support image display.

The term "set", as used herein, refers to a non-empty set, as the concept of a collection of elements or members of a set is widely understood in elementary mathematics. The term "subset", unless otherwise explicitly stated, is used herein to refer to a non-empty proper subset that is, to a subset of the larger set, having one or more members. For a set S, a subset may comprise the complete set S. A "proper subset" of set S, however, is strictly contained in set S and excludes at least one member of set S. Two subsets are disjoint if their intersection is the empty set, that is, if they have no elements in common. Two subsets A and B are unequal if both B is not a subset of A and A is not a subset of B. In such a case, one or more members of each subset is not a member of their intersection. Partitioning separates members of a set into two or more disjoint subsets.

Where used, the terms "first", "second", and the like, do not necessarily denote any ordinal or priority relation, but may simply be used to more clearly distinguish one element from another. Similarly, the terms "subject pixel" or "subject voxel" are used to indicate a particular image data element as it is operated upon in segmentation processing using methods of the present invention.

For the image processing steps described herein, the terms "pixels" for picture elements, conventionally used with respect 2-D imaging and image display, and "voxels" for volume image elements, often used with respect to 3-D imaging, can be used interchangeably. It should be noted that the 3-D volume image is itself synthesized from image data obtained as pixels on a 2-D sensor array and displays as a 2-D image from some angle of view. Thus, 2-D image processing and image analysis techniques can be applied to the 3-D volume image data. In the description that follows, techniques described as operating upon pixels may alternately be described as operating upon the 3-D voxel data that is stored and represented in the form of 2-D pixel data for display. In the same way, techniques that operate upon voxel data can also be described as operating upon pixels. In description and formulas that follow, the variable x is used to indicate a subject voxel at a particular spatial location or, alternately considered, a subject pixel.

Embodiments of the present invention provide a semi-automated method for segmenting liver lesions in 3D CT scans. User interaction is similar to a RECIST measurement that is conventionally used to establish the size of a lesion. The foundation of the lesion segmentation process is a two-phase, regional-variational segmentation model. The segmentation algorithm uses non-parametric, probability density function-based region models to simultaneously distinguish the tumor from the liver parenchyma while estimating the underlying distributions of the two regions. A number of pre- and post-segmentation techniques are used to improve the segmentation and to handle segmentation leakage into the normal anatomy.

Typically, the lesion (object) (i) is closer to being homogeneous; whereas, the bounding environment or bounding tissue (bounding object (ii)) can be complex and composed of multiple types of tissues/organs (regions). The lesion itself is not only surrounded by parenchyma as a bounding object, but it can be in close proximity to the liver's vascular structure, and if located at the boundary of the liver, it can also be in close proximity to other organs, to muscle, and to air. To overcome these limitations, more complex multi-region models, known in the image processing arts, can be used, but at the expense of more computational complexity. Embodiments of the present invention limit the domain of the segmentation process to a volume of interest (VOI) surrounding the lesion and use a priori knowledge of liver lesions and parenchyma in order to preprocess the VOI region so that it conforms more closely to a two-region (two-phase) system composed of the lesion (object) and the bounding parenchyma (bounding object or bounding tissue). In the description that follows, the bounding parenchyma is alternatively referred to as the object's background.

Processing Steps

Figure 1:
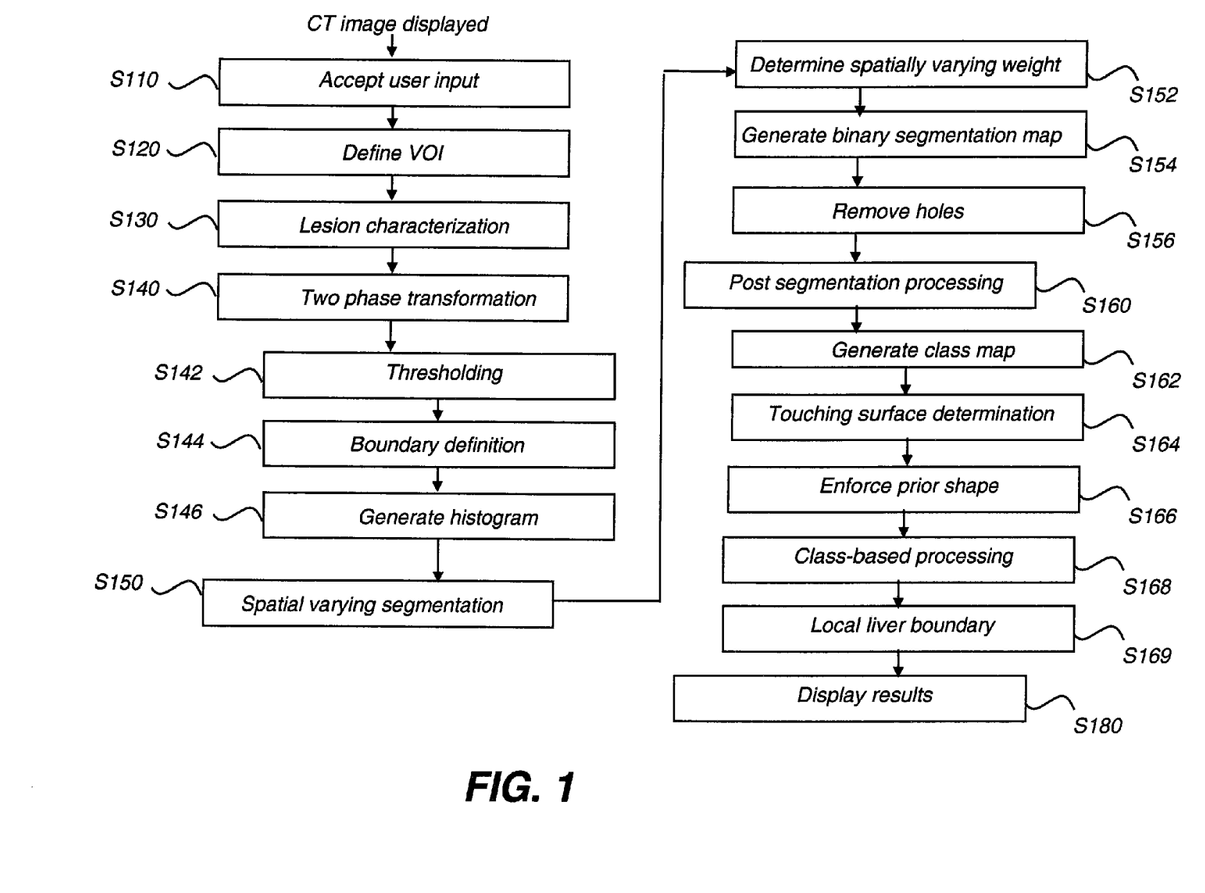
FIG. 1 is a logic flow diagram that shows the sequence for segmentation of lesions of the liver according to one embodiment.
Figure 2A:
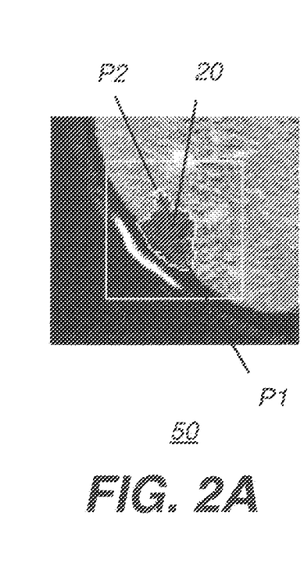
FIGS. 2A-2D are plan views that shows stroke input and lesion appearance for both hyperdense and hypodense lesions.
Figure 2B:
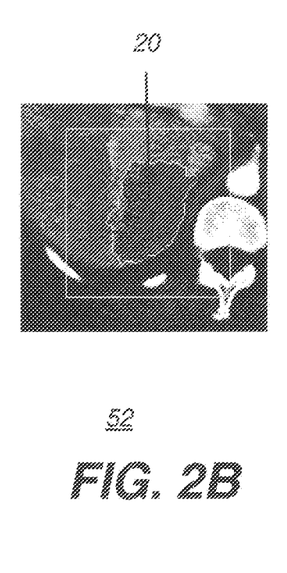
Figure 2C:
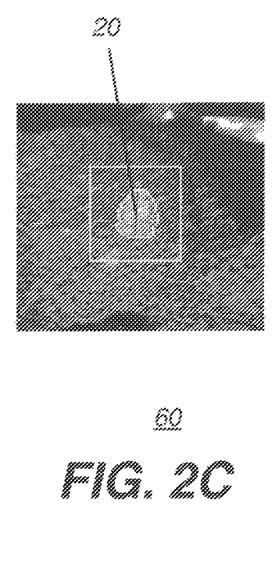
Figure 2D:
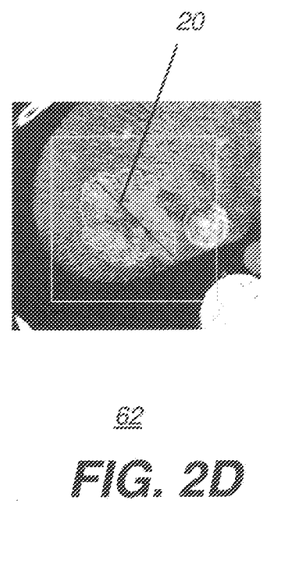

With the CT image generated and displayed, segmentation processing of the present invention can begin. FIG. 1 identifies steps used for segmentation processing, defined in more detail in the description that follows. FIGS. 2-9 show different user interface features and response for lesion segmentation using the steps.

In an initial user input step S110, the radiologist or other user draws one or more strokes across the displayed lesion, such as in an axial slice. FIGS. 2A-2D show the use of a single stroke 20 across lesions 50, 52, 60, and 62 in various examples. In a manner analogous to the use of RECIST criteria, each stroke 20 defines at least endpoint pixels (alternately considered, voxels) P1 and P2 of a line that spans a suspected lesion. The endpoints of the stroke lines can be located near, but not necessarily exactly on or within, the boundary of the liver lesion.

In one embodiment, subsequent strokes are then provided in orthogonal planes, such as in a coronal or sagittal plane, in order to better define the volume of the lesion. Alternately, an additional stroke 20 can be made in the same plane, in which case the additional stroke need not be orthogonal to the initial stroke. In an alternative embodiment, the user can draw a third stroke selected from an orthogonal view of the same CT voxel data. For example, if the first two stroke lines were initially selected from an axial CT slice, the third stroke line may be selected in similar fashion from either a coronal or sagittal slice. By allowing the use of multiple strokes 20 in orthogonal planes, this embodiment helps to more closely define the VOI in the near vicinity of the lesion.

Continuing with the sequence of FIG. 1, a define VOI step S120 is executed, wherein the VOI is defined by the union of an ellipsoid bounding the user stroke inputs and a narrow band surrounding the ellipsoid. If the user input is a single stroke, the VOI is defined by a sphere that encloses both the stroke and a surrounding spherical narrow band. If the input corresponds to two stroke lines, a third stroke line perpendicular to the plane containing the two strokes is defined and is used in determining the bounding ellipsoid. The length of the synthesized stroke can be set equal to the length of one of the input stroke lines or to the average length of the two stroke lines. For the purpose of the description herein, the invention will be described for the case of a single user input stroke. One skilled in the art will be capable of extending the descriptions to the case of multiple input strokes. Subsequent analysis is then performed using voxels that lie within this volume.

In an optional denoising/smoothing process that can be part of step S120, the noise in the CT data is reduced by applying a denoising/smoothing filter to the data contained within the VOI. Examples of suitable filters are the anisotropic, variational (e.g. Rudin-Osher-Fatemi or ROF denoising), and median denoising filters.

A lesion characterization step S130, determines whether the lesion identified by stroke 20 is hypodense, hyperdense, or mixed (containing both hypo- and hyperdense regions), and the characteristic values of the lesion. In step S130, the lesion and parenchyma histograms are analyzed, respectively, using the voxels contained within a circle enclosing the stroke and the voxels contained within a narrow band around the circle. The relative density of the parenchyma, compared to the lesion, is determined by analyzing peak locations within the initial lesion and parenchyma histograms. The characteristic values corresponding to the minimum, maximum, and average intensity values of the lesion are determined by analyzing the voxels under the dilated stroke.

In a two-phase transformation step S140, the results of lesion characterization step and a priori information are used to pre process the VOI region so that it conforms more closely to a two-region (two-phase) system. The voxels within the VOI are partitioned into two subsets of voxels. The first subset of voxels contains voxels that are determined to be neither parenchyma nor lesion and the second subset of voxels contains voxels that are determined to be either parenchyma or lesion. The two subsets of voxels are nonintersecting or disjoint subsets. The voxels contained within the second subset constitute a two-region (two-phase) system that will be further partitioned into an object (lesion) and background (parenchyma) or bounding object using a spatially varying two-phase segmentation process that will be described in more detail subsequently.

The logic flow diagram of FIG. 1 shows three sub-steps S142, S144, and S146 that are part of two-phase transformation step S140. Initially all voxels within the VOI are added to the second subset. In threshold step S142, a low threshold $\tau_l$ and a high threshold $\tau_h$ are determined from the characteristic values of the lesion and are used to partition the voxels within the VOI into the two aforementioned subsets of voxels. If the lesion was deemed hypodense $\tau_l$=(minimum+0.1*average)/2 and $\tau_h$=150 and if the lesion was deemed hyperdense $\tau_L$=0 and $\tau_H$=maximum. Voxels whose intensities are below threshold $\tau_l$ or above $\tau_h$ are consider neither lesion nor parenchyma and are removed from the second subset and added to the first subset. It can be appreciated by one skilled in the art that these threshold calculations and values are exemplary and can be modified according to imaging and patient conditions.

Figure 3:
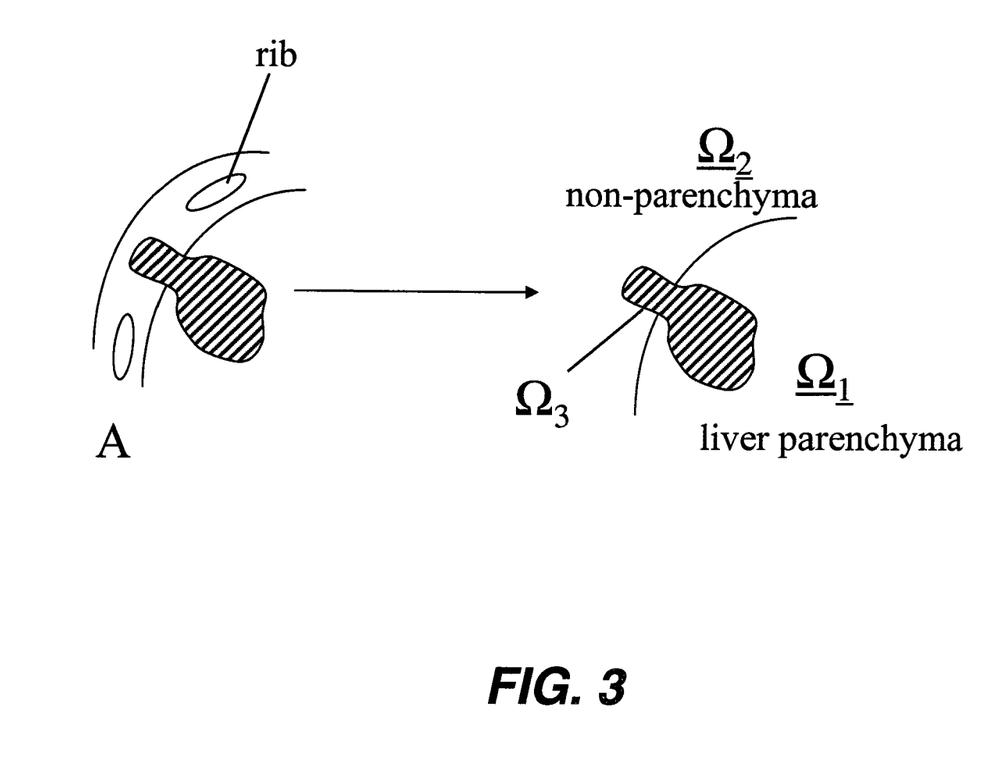
FIG. 3 is a diagram showing leakage of the segmentation beyond the boundary of the liver.

Boundary lesions that reside close to the edge of the liver can pose a particular problem for the segmentation model. Boundary lesions can have intensities that resemble those of surrounding normal anatomical features or structures, such as intercostal muscle and abdominal organs. This can cause some problems in segmentation, particularly with respect to leakage of the segmentation into surrounding anatomy. FIG. 3 shows a schematic representation of leakage that can occur near the boundary of the liver. Three types of tissue are represented in FIG. 3, the liver parenchyma $\Omega 1$, lesion $\Omega 3$, and non-parenchyma tissue $\Omega 2$. The normal anatomy of the liver surface and organs that are in contact with the liver can be used to define a boundary that the lesion segmentation should not cross. In liver boundary defining step S144, voxels within the VOI that reside outside the boundary of the liver are removed from the second subset and added to the first subset of voxels. The boundary of the liver can be determined by a liver segmentation process such as that described by H. Ling, et. al. in "Hierarchical, Learning-based Automatic Liver Segmentation" in IEEE Computer Society *Conference on Computer Vision and Pattern Recognition* (*CVPR*), Anchorage, Ak., June 2008.

Achieving a robust, boundary-accurate liver segmentation can be a difficult task and is CPU intensive. Alternatively, an approximate local liver boundary can be used to help in ameliorating the segmentation leakage. An example of an approximate local boundary is the boundary defined from the rib cage surrounding the liver. A rib cage barrier mask, described in more detail subsequently, can be generated to prevent or mitigate the lesion segmentation from leaking into the muscle between the ribs. The voxels contained in the rib cage barrier mask are removed from the second subset and added to the first subset of voxels.

Variations in factors such as contrast injection rate, scan timing, and patient physiology can lead to spatial variations in the contrast concentration within the liver and in the uptake of contrast agent by the liver parenchyma. These variations can result in nonuniform intensity within the CT image of the liver. Lesions that are surrounded by nonuniformly contrast-enhanced parenchyma are more susceptible to being poorly segmented by the variational process that will be described in more detail subsequently. In optional nonuniformity intensity correction step S146, intensity nonuniformities are removed from voxels within the VOI. Embodiments of the present invention subsequently described use a linear polynomial correction term with zero offset to model and remove the spatial intensity nonuniformity. In an alternative embodiment, also to be described subsequently, intensity nonuniformity correction and lesion segmentation are solved simultaneously.

Following two-phase transformation step S140, the voxels that remain for consideration in segmentation processing step S150, i.e. those that are contained within the second subset, can be coarsely considered to be in either (i) the object or lesion phase or (ii) the background or parenchyma phase as a bounding object. A spatially varying segmentation step S150 can then be executed to perform the iterative segmentation processing.

Variational Segmentation

In embodiments of the present invention, a two-phase, region-based, variational-segmentation model is used to segment lesions from the liver parenchyma in segmentation step S150. The principle is to minimize the sum of (i) regional data terms that encode the underlying model of each region, and (ii) a regularization term that helps to provide smoothness.

The lesion segmentation is obtained by minimizing the following continuous convex energy model with respect to u(x):

$$E_1(u) = \int_\Omega |\nabla u(x)| dx + \lambda \int_\Omega r_1(x) u(x) dx + \lambda \int_\Omega r_2(x)(1 - u(x)) dx, \quad (1)$$

Here, u(x) is a continuous segmentation variable that varies between [0,1]; $r_1(x)$ and $r_2(x)$ are regional error functions for object and background, respectively; λ is a parameter that balances the regional data and regularization terms; x is the spatial location of a subject pixel; and Ω is the domain of the VOI.

The final binary segmentation is then obtained by thresholding the minimizer u of $E_1$. The region $\Omega_1$, defining the segmented lesion is given {x: u(x)>μ}. For certain values of λ, the minimization of $E_1$ often leads directly to segmentation results that are essentially binary. The first term is a total variation regularizer of the segmentation variable u. The regularization term ensures the smoothness of the segmentation by penalizing the length of the level sets of u. The second term is a regional data term and is used to incorporate error functions that encode the underlying model of the lesion $r_1(x)$ and background $r_2(x)$ regions.

The minimization of (1) is equivalent to minimizing the following model with respect to u(x):

$$E_2(u) = \int_\Omega |\nabla u(x) dx| + \lambda \int_\Omega R(x) u(x) dx, \quad (2)$$

where $R(x)=r_1(x)-r_2(x)$ is a region competition function. The region competition term can be used to encode different types of information related to the segmentation problem such as prior shape information.

The results of the segmentation process can be enhanced by using a spatially varying regularizer/data term:

$$E_2(u) = \int_\Omega |\nabla u(x) dx| + \int_\Omega \lambda(x) R(x) u(x) dx \quad (3)$$

where λ(x) is a spatially varying weight that is used to control the smoothness of the segmentation boundaries based upon the lesion's location in the liver (VOI).

As noted earlier, lesions close to the edge of the liver can pose a problem for any segmentation approach, causing leakage. In addition, partial volume effects can also allow the segmentation to leak onto adjacent abdominal organs. The boundary of the liver is a fairly regular and smooth surface. For lesions that reside next to the surface of the liver, one would expect that the boundary of the lesion in contact with the surface should be smooth whereas the internal boundary of the lesion that is in contact with the parenchyma can be more irregular. To encourage lesion segmentation to have smoother lesion boundaries near the surface of the liver, the value of λ should be smaller near the liver surface as compared to its value inside the liver.

In a determine spatially varying weight step S152 (FIG. 1), the spatially varying weight λ(x) is determined using the voxels contained within the first subset. In one embodiment, a binary mask M(x) is generated using the voxels contained within the first subset and the mask is dilated to form mask Md(x) by an amount proportional to stroke line 20. In an alternative embodiment, the binary mask is blurred using a Gaussian filter whose sigma (σ) value is a function of the stroke line 20. In regions within the second subset covered by the dilated (blurred) mask Md(x), λ(x) is set to a smaller value than in regions not covered by the dilated mask. In one embodiment the value of λ(x) within the dilated (blurred) mask is λ(x)=0.5*$\lambda_0$*Md(x) and outside the mask λ(x) is set equal to $\lambda_0$.

To segment the lesion from the background, embodiments of the present invention use region-competition data terms that maximize the distance (difference or dissimilarity) between the object (lesion) and the background (parenchyma) probability distribution functions (pdfs). The probability distribution functions can be determined a priori (supervised segmentation) or estimated during the minimization process (unsupervised segmentation). Embodiments of the present invention use unsupervised segmentation, performing segmentation and determining the pdfs at the same time.

The following simplified region-competition function was found to be workable for segmenting liver lesions. The chosen competition function minimizes the similarity between the object o (lesion) and the background b (parenchyma) or bounding object distributions:

$$R(I,x)=P_b(I(x))-P_o(I(x)), \quad (4)$$

wherein $P_o$ and $P_b$ are the pdfs of the density variable for the object and background, respectively, and I(x) is the intensity variable, in Hounsfield units, at spatial location x.

Non-parametric kernel methods have been used to estimate the underlying distributions from the data without any assumptions about the structure of the distributions. The object and background pdfs are given by:

$$P_o(z) = \frac{\int_\Omega K(z - I(x)) u(x) dx}{\int_\Omega u(x) dx} \quad (5)$$

$$P_b(z) = \frac{\int_\Omega K(z - I(x))(1 - u(x)) dx}{\int_\Omega (1 - u(x)) dx}.$$

Typical choices for kernel K are the Dirac delta function and the Gaussian kernel.

The minimization of equation (3) with respect to u is performed using a known approach, described by Bresson et al. in an article entitled "Fast global minimization of the active contour/snake model", *Journal of Mathematical Imaging and Vision*, vol. 28, no. 2, pp. 151-167, 2007, that introduces a new auxiliary function v such that $$E_3(u) = \int_\Omega |\nabla u(x) dx| + \frac{1}{2\theta} \int_\Omega (u(x) - v(x))^2 dx + \int_\Omega \lambda(x) R(x) v(x) dx \quad (6)$$

where θ is a small positive constant. The minimizer of $E_3$ is computed by first fixing u and v, and updating lesion $P_O$ and background $P_B$ pdfs using equation (5). Then $E_3$ is minimized with respect to u while v, $P_O$, and $P_B$ are fixed:

$$\min_u \left\{ \int_\Omega |\nabla u(x)| dx + \frac{1}{2\theta} \int_\Omega (u(x) - v(x))^2 dx \right\}, \quad (7)$$

Then $E_3$ is minimized with respect to v, while u, $P_O$, and $P_B$ are fixed:

$$\min_v \left\{ \frac{1}{2\theta} \int_\Omega (u(x) - v(x))^2 dx + \int_\Omega \lambda(x) R(x) v(x) dx \right\}. \quad (8)$$

Minimization in (7) with respect to u corresponds to solving the Rudin, Osher, and Fatemi (ROF) denoising model, known to those skilled in the image processing arts, which is done using Chambolle's dual/projection method. The minimization of (8) with respect to v is given by:

$$v(x) = \min\{\max\{0, u(x) - \theta\lambda(x) R(x)\}, 1\}. \quad (9)$$

These three steps repeat until convergence. In iterative processing, variable u(x) approaches 1 for the object (lesion); variable u(x) approaches 0 for the background or bounding object (parenchyma). For a majority of lesions, the parameter set $\Phi = (\lambda = 0.5 - 2.0, \theta = 0.1, \mu = 0.1 - 0.5)$ has been shown to yield acceptable and consistent segmentation results.

In a generate binary segmentation map s(x) step S154, the continuous segmentation u(x) function is converted into a binary segmentation map s(x) via a region growing process. The region growing starts from a known seed point within the lesion, e.g. the center point of stroke 20, and adds neighboring voxels to the segmentation map if u(x) of the neighboring voxels is greater than a threshold value µ. Alternatively, binary segmentation map s(x) is generated by thresholding the continuous segmentation u(x) by a threshold µ:

$$s(x) = \begin{cases} 0 & u(x) < \mu \\ 1 & u(x) \geq \mu \end{cases} \quad (10)$$

to yield a binary segmentation and keeping only the connected component containing the aforementioned seed point. In an alternative embodiment, the segmentation map s(x) is generated using two threshold values µ1 and µ2 where µ1>µ2. The initial segmentation map is generated as outlined above using threshold µ1. The segmentation map is dilated n times by adding voxels whose u(x)>µ2 to the segmentation map. In a preferred embodiment, µ1=0.5, µ2=0.15, and number of dilation steps n=2. In a remove holes step S156, the segmentation map s(x) is processed to remove any "holes" lying within the segmented lesion.

For lesions that comprise both high- and low-contrast regions, the parameter set Φ can sometimes lead to the under segmentation of the low-contrast region. This is easily remedied by increasing the weight on the data term. For example, in FIG. 2, lesion 50 has distinct high- and low-contrast regions. As can be seen in lesion 52, the parameter set $\Phi = (\lambda = 1.0, \theta = 0.1, \mu = 0.25)$ segments only the high-contrast region of the lesion; whereas, increasing the weight on the regional data term λ=1.5 leads to both high- and low-contrast parts of the lesion being correctly segmented. For CT volumes that have large slice thickness, which is due to partial volume effects, a diffuse low-contrast region can sometimes surround the lesion. Once again, this can lead to under-segmentation of the outer ring, which can be ameliorated by increasing the weight on the data term. In some cases, increasing the weight on the data term leads to a rougher and/or more disjointed segmentation boundary that can be fixed by smoothing the boundary.

In some cases of segmentation leakage, increasing the weight on the regularizer controls the leakage and produces acceptable lesion segmentations. Note that the strength of the regularizer is increased by decreasing the value of λ. The increased strength of the regularizer typically results in more spherical segmentations with smoother boundaries. If the weight of the regularizer is excessive, the segmentation is dominated by the effects of the regularizer, leading to mean curvature flow. In such a case, the lesion can be under-segmented.

Figure 4:
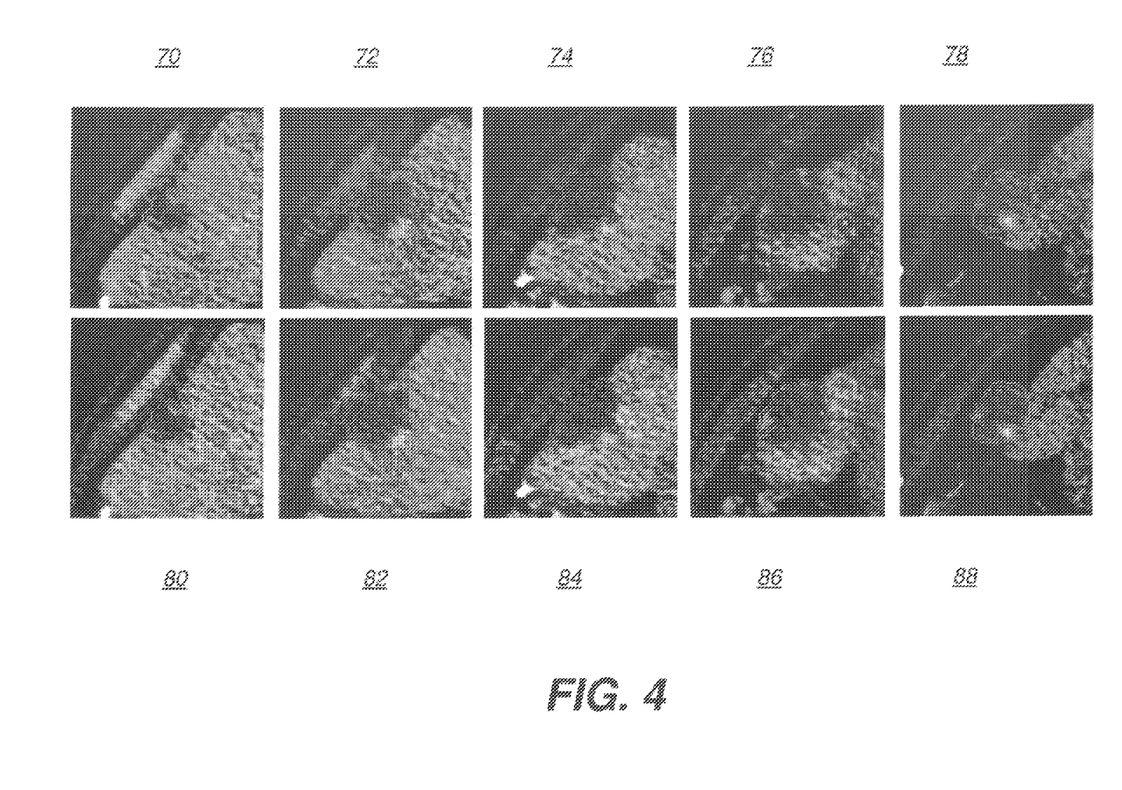
FIG. 4 is a set of images for different slices of a CT image, showing the tendency for leakage at various parameter levels.

The effect of controlling segmentation leakage with a regularizer is shown in the images in FIG. 4. The segmentation results for λ=1.0, θ=0.1, and µ=0.25 shows leakage into the muscle region bordering the lesion in a number of axial slices, as shown in images 70, 72, 74, 76, and 78. In FIG. 4, each of the images 70, 72, 74, 76, and 78 in the top row corresponds to the image beneath it in the lower row so that, for example, image 70 and 80 are the same image, with different segmentation parameters applied.

The segmentation leakage for corresponding images 80, 82, 84, 86, and 88 can be prevented by decreasing λ to 0.4. As mentioned previously, the increased strength of the regularizer has led to the lesion being slightly under segmented in some slices, as is particularly shown in images 84, 86, and 88. In general, the λ value needed to prevent lesion leakage varies from case to case, thus an a priori setting of λ to prevent leakage does not appear to be workable.

In a post segmentation-processing step S160 (FIG. 1), if it is deemed that the lesion is touching the surface of the liver, the binary segmentation map s(x) undergoes further processing to mitigate potential leakage into normal anatomy.

Figure 5A:
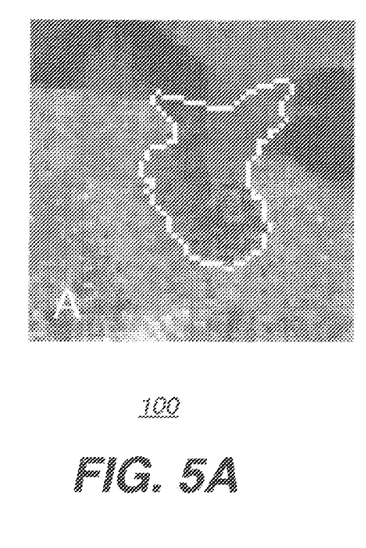
FIGS. 5A-5C show images and a class map for boundary segmentation post-processing.
Figure 5B:
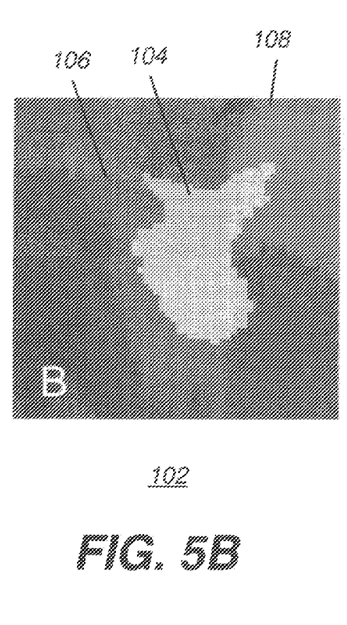
Figure 5C:
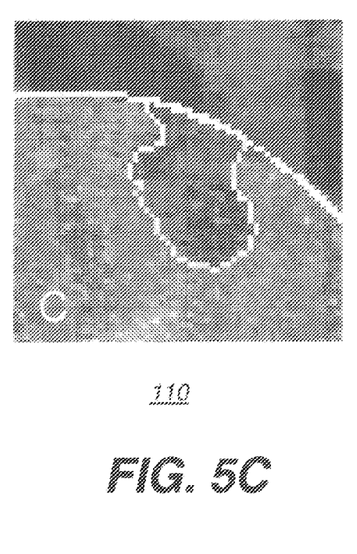

Continuing with the sequence of FIG. 1, in a generate class map step S162, the results of segmentation step S150 are used to generate a class map. As shown in FIGS. 5A-5C, after segmenting the lesion as shown at A in an image 100 of FIG. 5A, the liver parenchyma $P_b$ and the lesion $P_o$ probability distribution functions, which were estimated during the segmentation step S150, are used to convert the VOI intensity data into a class map C(x) 102 shown at B in FIG. 5B, composed of three classes. The resulting lesion segmentation map defines a lesion class 104. A liver parenchyma class 106 is defined by the estimated parenchyma distribution. A non-parenchyma class 108 is composed of tissue that is neither liver parenchyma nor segmented lesion. The resulting class map is morphologically processed to remove internal regions of one class, e.g., non-parenchyma, within a region of another class, e.g., parenchyma.

In a lesion touching liver surface determination step S164, the class map C(x) 102 is used to determine if the lesion is touching the surface of the liver. If the ratio of non-parenchyma class voxels 108 to total number of voxels touching the boundary of lesion class voxels 104 is greater than a specified threshold then the lesion is consider to be potentially touching the surface of the liver. In one embodiment, the threshold is set to 0.1.

Leakage of the segmentation into normal anatomy can occur via the segmentation creeping along the boundary of the liver or into the muscle surrounding the liver. If one has prior knowledge of an object (predefined shape or shape prior), it can be used during segmentation processing to influence the segmentation results or can be used after the segmentation process to modify the resulting segmentation map.

One method for constraining leakage is to use a shape prior, as is known to those skilled in the image processing arts. The shape prior can be a predefined shape that is based upon the shape of a specific object class or a geometric property of an object. Referring again to FIG. 1, the enforce prior shape step S166 uses a shape prior to modify the segmentation map from step S162. In one embodiment, a geometric star shape prior 140 is used to enforce a prior shape upon the segmentation map. A star shape prior 140 is defined with respect to a center point C within lesion Ω3 and for any point Q1 that lies inside the lesion; all points on the straight line between the center C and Q1 also lie inside lesion Ω3.

Figure 6:
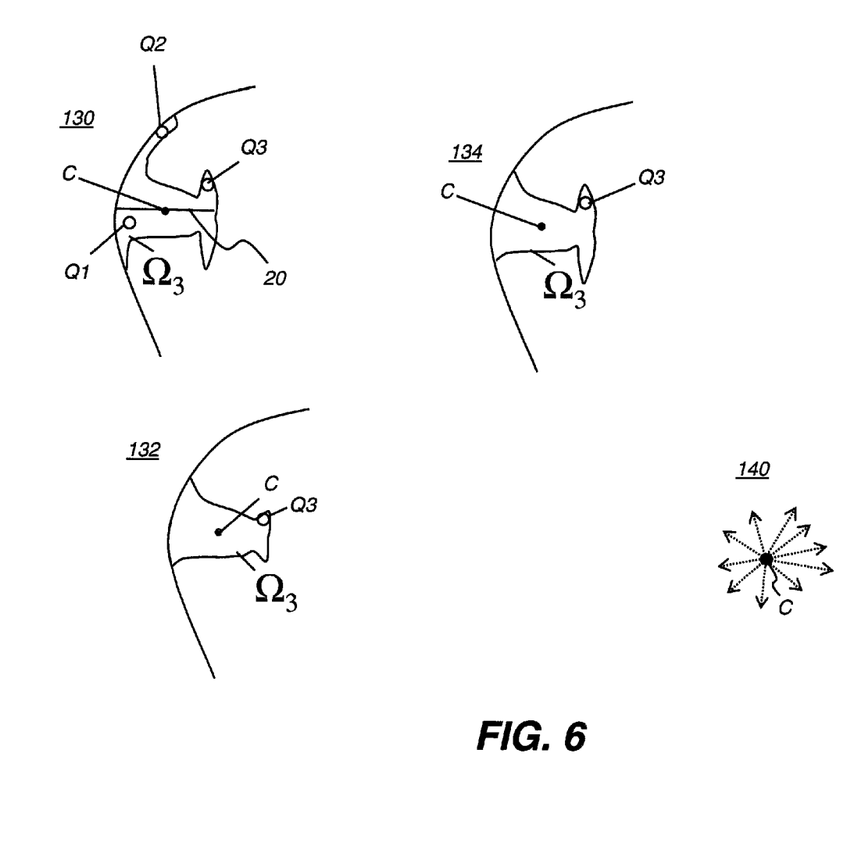
FIG. 6 shows a series of segmentation maps showing various types of leakage for a lesion near the surface of the liver.

In the FIG. 6 examples of segmentation maps 130, 132, 134, the center point C is used to enforce the star shape on the segmentation map. In a preferred embodiment, the center point corresponds to the midpoint of stroke 20. Alternative center points are the center of mass of the segmentation map or some other suitable point. Point Q1 lies clearly within the lesion. Point Q2 is considered to lie outside the lesion and to indicate leakage along the surface of lesion Ω3. Enforcing the star shape upon lesion segmentation map 130 results in producing lesion segmentation map 132. For lesions Ω3 that reside next to the surface of the liver, as shown in the segmentation maps of FIG. 6, one would expect that the boundary of lesion Ω3 that is in contact with the surface would be smooth whereas the internal boundary of the lesion that is in contact with the parenchyma can be more irregular. Thus, point Q3 can be considered part of the lesion. In an alternative embodiment, the star-shaped shape prior 140 of FIG. 6 is enforced only on voxels that are contained in regions that are in contact with non-parenchyma class voxels. For segmentation map 130, this will result in segmentation map 134 in which internal points that are in contact with the parenchyma are not removed from the segmentation map.

Referring again to FIG. 1, in a morphological class based processing step S168, the segmentation map undergoes a morphological opening only in regions that are in contact with non-parenchyma class voxels 108 (FIG. 5). The morphological opening is performed on a binary image that is formed by setting the voxels belonging to either lesion 104 or parenchyma 106 classes to 1 and voxels belonging to non-parenchyma class to 0. In a preferred embodiment, the size of the structuring element is set to approximately 3.0 mm.

Referring again to FIG. 1, in a local liver boundary step S169, the results of segmentation step S150 are used to determine a local liver boundary according to anatomy features of the liver or surrounding structures. In one embodiment, the boundary is based upon a parametric shape model of the liver surface. Examples of a class of parametric models that can be used to model the local liver surface include low-order polynomials. This boundary is then used as a clipping boundary to constrain the segmentation map to be within the boundary. In one embodiment that will be described in more detail subsequently, a parabolic boundary is fit to the data contained within the class map determined in step S162.

Nonuniformity Correction

Given that intensity nonuniformity tends to be slowly varying within the VOI, it is reasonable to approximate the nonuniformity by a smooth parametric function. Embodiments of the present invention use a linear polynomial correction term with zero offset to model the spatial intensity nonuniformity.

For the preprocessing nonuniformity correction, this method maximizes the energy density of the histogram of the VOI:

$$E_5(p, a) = \int p^2(z)dz = \int \left[\frac{\int_\Omega K(I(x) + a^T x - z)dx}{\int_\Omega dx}\right]^2 dz, \quad (11)$$

where p(z) is the histogram of the VOI, and $a^T x = a_1 x_1 + a_2 x_2 + a_3 x_3$ is a linear correction term. The polynomial coefficients are determined in a manner similar to optimization of the Lucas-Kanade optical flow algorithm that is familiar to those skilled in the image processing arts. It is assumed that a current estimate of parameters a are known. Next, this method iteratively solves for increments to parameters Δa. The following expression is optimized:

$$E_6(p, a) = \int p^2(z)dz \quad (12)$$
$$= \int \left[\frac{\int_\Omega K(I(x) + (a + \Delta a)^T x - z)dx}{\int_\Omega dx}\right]^2 dz,$$

with respect to Δa, and then the parameters are updated a=a+Δa. This process iterates until the estimates of parameters a converge. The nonlinear expression in (11) is linearized by replacing K( ) by its first-order Taylor expansion about the current estimate $I(x+a^T x)$. Now taking the partial derivatives of the energy $E_6$ with respect to the increments Δa leads to a linear system of equations for updating Δa.

The joint nonuniformity correction and lesion segmentation is obtained by minimizing the following energy model with respect to u(x) and coefficients a of the linear polynomial $$E_4(p_1, p_2, u, a) = \int_\Omega |u(x)|dx + \lambda \int_\Omega [1 - p_O(I(x) + a^T x)]u(x)dx + \quad (13)$$
$$\lambda \int_\Omega [1 - p_B(I(x) + a^T x)](1 - u(x))dx,$$

wherein $p_O$ and $p_B$ are given by (4). For this case, the $p_O$ and $p_B$ are replaced by their respective second-order expansion. To minimize $E_4$, the Bresson approach outlined above minimizes $E_3$ by adding a fourth step of computing a few iterations of the linear updating of the polynomial coefficients to each cycle of the function updates. The optimization of $E_4$ to determine the polynomial coefficients is analogous to the optimization of $E_6$.

Figure 7A:
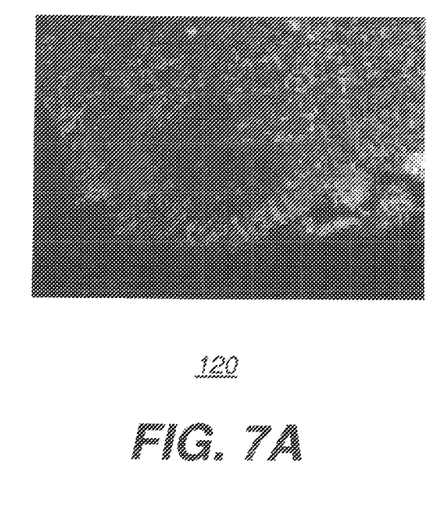
FIGS. 7A-7C show a series of images that illustrate, by way of example, how preprocessing nonuniformity correction affects the segmentation of a hypodense lesion.
Figure 7B:
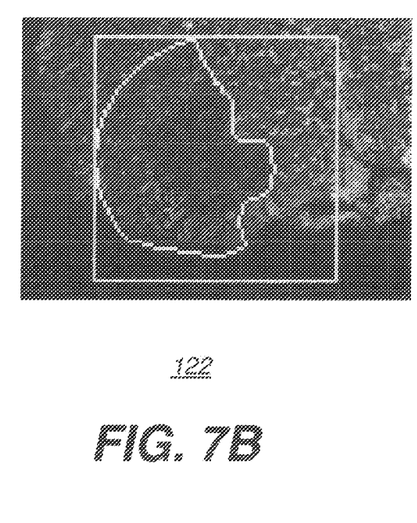
Figure 7C:
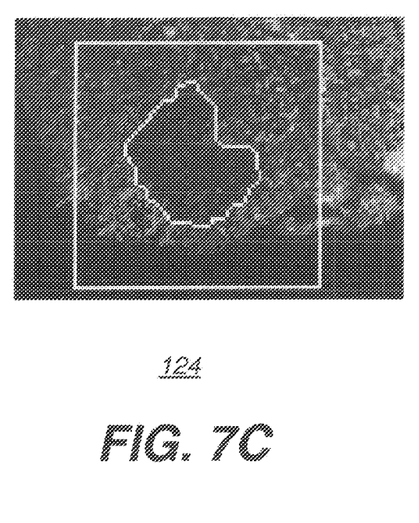

By way of example, FIGS. 7A-7C show how the preprocessing nonuniformity correction affects the segmentation of a hypodense lesion. An image 120 of FIG. 7A shows a lesion that is surrounded by nonuniformly enhanced parenchyma; the intensity of the parenchyma gradually increases across the image. An image 122 of FIG. 7B then shows the lesion segmentation as a result of using the $E_3$ model. It is clearly seen that the hypodense part of the parenchyma is incorrectly identified as a lesion. An image 124 of FIG. 7C shows the corrected intensity and lesion segmentation results obtained by first applying the presegmentation-nonuniformity correction model $E_5$ and then segmenting the lesion using the $E_3$ model. Applying the density correction to the VOI results in a relatively uniform parenchyma, thus enabling the correct segmentation of the lesion. The linear nonuniformity correction shows its greatest utility in improving the segmentation of small lesions surrounded by nonuniform parenchyma. Both nonuniformity correction techniques have obtained similar results.

Forming a Rib Cage Barrier

To prevent or at least mitigate the lesion segmentation from leaking into the muscle between the ribs, embodiments of the present invention use the rib cage adjacent to the lesion to form a barrier. A rib cage barrier algorithm works by first segmenting the ribs and then filling in the region between adjacent ribs. The ribs are segmented by utilizing a seeded 3D region-growing algorithm, using techniques well known to those skilled in the image processing arts. Seed points belonging to the ribs are found by starting outside the body and analyzing intensity profiles, moving in the direction of the center of the body. The profile is analyzed for the fat/muscle interface and then searched for voxels whose density exceeds 200 HU within a predefined distance from the fat/muscle interface. This process is repeated for each axial slice, and the identified points are used in a region-growing algorithm where neighboring voxels are added if their density is greater than 200 HU. If desired, the resulting rib mask can be further processed using morphological processing.

One approach for generating a rib cage barrier is to dilate the rib mask by a predefined distance in the z direction. This approach, however, can be less than satisfactory in regions where adjacent ribs are laterally displaced from each other. The resulting mask generated from such dilated ribs may protrude into the liver and lesion, leading to an incorrect segmentation of the lesion. A superior approach for generating the barrier is to dilate one or more of the ribs in a direction defined by the location of its adjacent ribs. Depending upon the lesion's location, the cross-sectional view of each rib can be seen either in the sagittal or coronal planes. A 2D connected component analysis is performed on either the sagittal or coronal plane images of the rib mask. The rib barrier for each slice is then generated by filling in the bounding box for each rib component and by filling in the region between the bounding boxes. The region between the bounding boxes is defined by connecting the corners of the bottom (top) of a bounding box to the corners of the top (bottom) of the adjacent bounding box. The algorithm is repeated for each plane contained within the VOI.

Figure 8A:
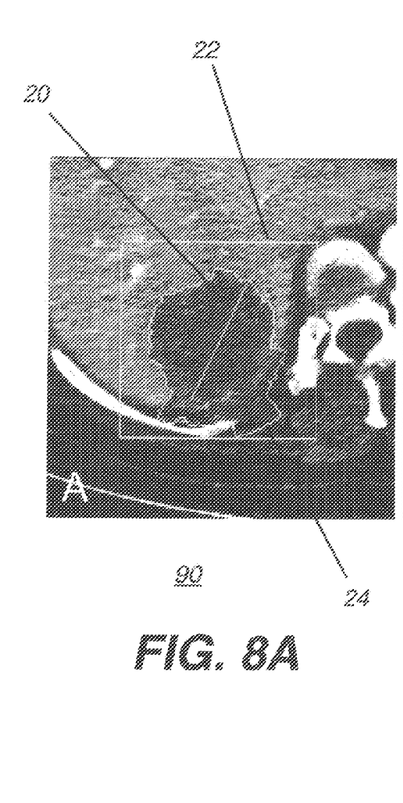
FIGS. 8A-8D is a set of images that show examples of segmentation leakage near rib cage structures and correction using rib cage masking.
Figure 8B:
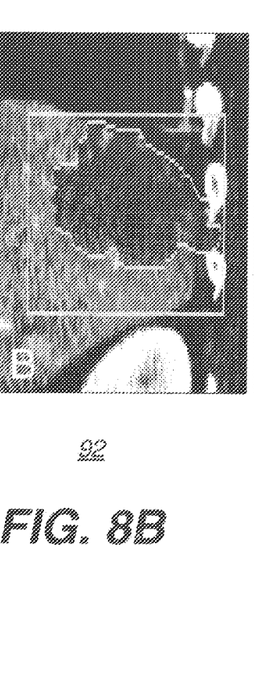
Figure 8C:
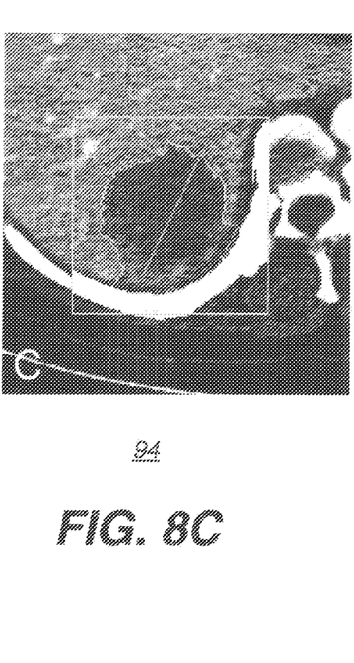
Figure 8D:
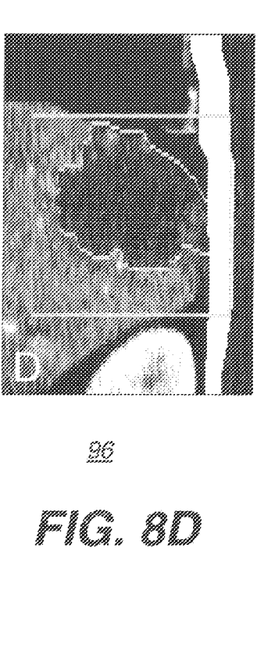

FIGS. 8A-8D show how forming the rib cage barrier helps to limit the lesion segmentation leakage in axial and sagittal images 94 and 96 of FIGS. 8C and 8D, respectively. In this case, the location of the lesion in a posterior section of the liver dictates the use of the sagittal planes to form the rib barrier. Without the barrier, the lesion segmentation would leak into the region between the ribs, as was shown in images 90 and 92 of FIGS. 8A and 8B.

Parabolic Boundary

A deformable 2D parabola is used to approximate the local convex boundary of the liver. This method for determining the optimal parabola is similar to an approach of using an ellipse as a deformable model to segment the endocardium from ultrasound images proposed by M. Tarron, et. al., "Border detection on short axis echocardiographic views using an ellipse driven region-based framework," (MICCAI2004), 2004.

Figure 9:
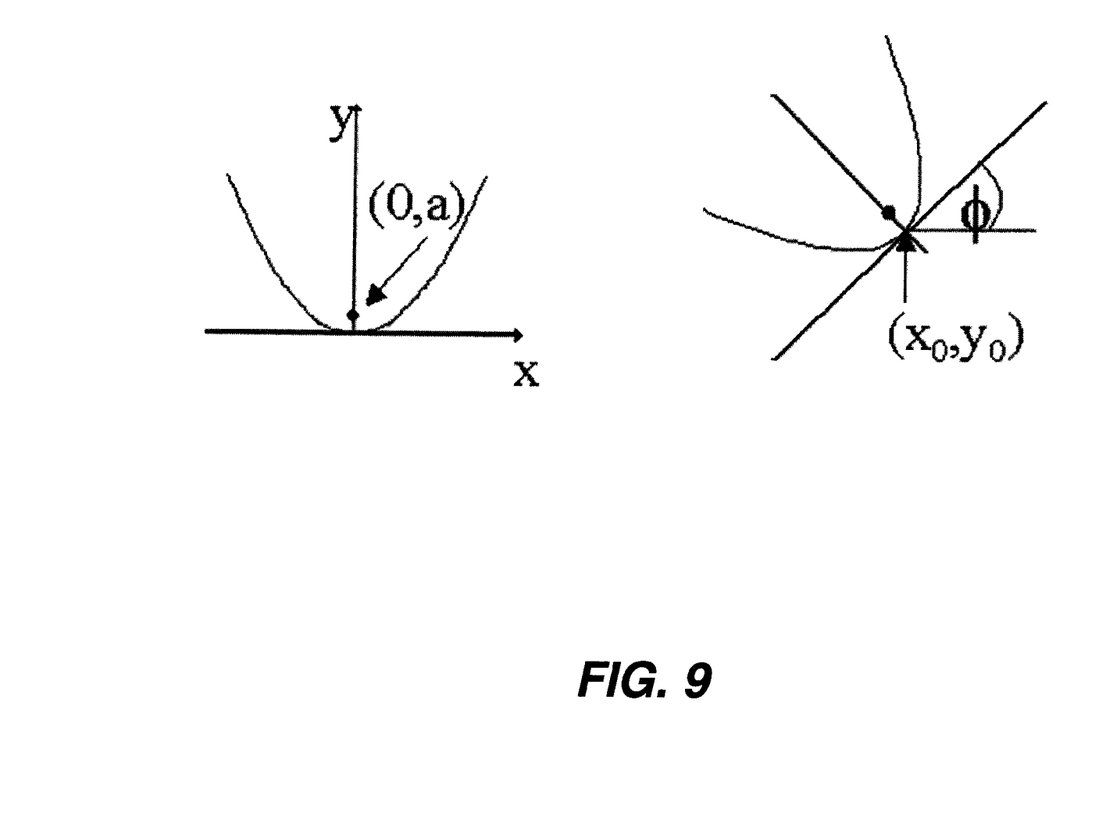
FIG. 9 is a diagram showing parabola parameters for boundary segmentation post-processing.

Referring to FIG. 9, the parabola is defined by the parameter vector $\Theta=[a, \phi, x_0, y_0]$, where a is the focal length of the parabola, $\phi$ is the rotation angle, and $x_0, y_0$ are the coordinates of the vertex of the parabola. The parametric form of the parabola is given by:

$$R_\Theta(t) = \begin{cases} x(t) = 2at\cos\phi - at^2\sin\theta + x_0 \\ y(t) = 2at\sin\phi + at^2\cos\theta + y_0, \end{cases} \quad (14)$$

Its implicit form is given by:

$$F_\Theta(x, y) = \frac{1}{4a}((x - x_0) \cdot \cos\phi + (y - y_0) \cdot \sin\phi) - \quad (15)$$
$$(-(x - x_0) \cdot \sin\phi + (y - y_0) \cdot \cos\phi).$$

The parabola, which represents the boundary of the liver, splits the image into two regions, representing the inside $\Omega_1$ and outside $\Omega_2$ of the liver. The parameters of the parabola are determined by minimizing, with respect to the $\Theta$, an energy function composed of gradient- and region-based image terms derived from a post-segmentation class map.

FIG. 3 showed an example using convex boundary estimation. Region $\Omega_1$ and $\Omega_2$, corresponds to voxels classified as parenchyma and classified as non-parenchyma, respectively. The image $I_c(x,y)$ used for determining $\Theta$ is a binary version of the class map $C(x)$ determined in step S162 where voxels classified as parenchyma are assigned the value of one, voxels classified as nonparenchyma are assigned the value zero, and lesion segmentation voxels are masked off and are excluded from the determination of the parabolic boundary.

The gradient term is defined as the sum of an edge indicator function g(x,y) over the boundary defined by the parabola:

$$E_1(\Theta) = \int_{t_1}^{t_2} g(R_\Theta(t))dt, \quad (16)$$

where one example of an edge indicator function is defined as:

$$g(x, y) = \frac{1}{1 + \alpha|\nabla(G * I(x, y))|^\beta}, \quad (17)$$

wherein $I_c$ is the class map image, G is a Gaussian kernel and $\alpha$ and $\beta$ are constants. The region-based term is defined as the sum of region term $r_1$ defined on $\Omega_1$ and a region term $r_2$ defined on $\Omega_2$.

$$E_2(x) = \int_{\Omega_1} r_1(x)dx + \int_{\Omega_2} r_2(x)dx \quad (18)$$
$$= \int_\Omega r_1(x) \cdot (1 - H(F_\Theta(x))) + r_2(x) \cdot H(F_\Theta(x))dx,$$

where H is the Heaviside operator. Each region is modeled as piecewise constant and values chosen are $r_1(x)=(I_c(x)-c_1)^2$ and $r_2(x)=(I_c(x)-c_2)^2$, where $c_1$ and $c_2$ are determined by $$c_1 = \frac{\int_{\Omega_1} I_c(x)dx}{\int_{\Omega_1} dx} \quad (19)$$

$$c_2 = \frac{\int_{\Omega_2} I_c(x) dx}{\int_{\Omega_2} dx}.$$

Parameters $c_1$ and $c_2$ are updated during the minimization process using the current parabola parameters to determine regions $\Omega_1$ and $\Omega_2$.

The energy function for determining the parabolic liver boundary is composed of a linear combination of the region and gradient terms. A gradient-descent method, along with a line search, is used to minimize the energy terms and recover the optimal parabola parameters. The initial parabola parameter estimates for the minimization are obtained by either having the user draw a line along the approximate liver boundary where the leakage has occurred or by analyzing the boundary of the lesion class 104 in class map C(x). The optimal parabola parameter results, from one axial slice, are used as an initial estimate for determining the parameters for an adjacent slice. This process is repeated for all axial slices that contain a part of the lesion within the VOI.

For the example in image 110 of FIG. 5C, the parabolic clipping surface was determined using only the regional energy term.

Referring back to the sequence of FIG. 1, once segmentation is completed, a display step S180 is then executed, displaying the segmentation for the radiologist on a display monitor. As shown, for example, in images 90, 92, 94, and 96 in FIGS. 8A-8D, the display shows, for various examples of identified lesion, stroke 20, an optional bounding box 22, and a segmentation border 24.

The invention has been described in detail with particular reference to a presently preferred embodiment, but it will be understood that variations and modifications can be effected within the spirit and scope of the invention. For example, while this method can be used for segmentation of lesions of the liver, the same approach is also usable for lesions detected in other bodily organs. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 20. | Stroke |
| 22. | Bounding box |
| 24. | Border |
| 50, 52. | Hypodense lesion |
| 60, 62. | Hyperdense lesion |
| 70, 72, 74, 76, 78. | Image |
| 80, 82, 84, 86, 88. | Image |
| 90, 92, 94, 96, 100. | Image |
| 102. | Class map |
| 104. | Lesion class |
| 106. | Liver parenchyma class |
| 108. | Non-parenchyma class |
| 110. | Image |
| 120, 122, 124. | Image |
| 130, 132, 134. | Segmentation map |
| 140. | Shape prior |
| C. | Center point |
| P1, P2. | Endpoint |
| Q1, Q2, Q3. | Point |
| S110. | User input step |
| S120. | Define VOI step |
| S130. | Lesion characterization step |
| S140. | Two-phase transformation step |
| S142. | Threshold step |
| S144. | Liver boundary defining step |
| S146. | Nonuniformity intensity correction step |
| S150. | Spatially varying segmentation step |
| S152. | Determine spatially varying weight step |
| S154. | Generate binary segmentation map s(x) step |
| S156. | Remove holes step |
| S160. | Post-segmentation-processing step |
| S162. | Generate class map step |
| S164. | Lesion touching liver surface step |
| S166. | Enforce prior shape step |
| S168. | Morphological class based processing step |
| S169. | Local liver boundary step |
| S180. | Display step |
| $\Omega$. | Domain |
| $\Omega_1$. | Liver parenchyma |
| $\Omega_2$. | Non-parenchyma tissue |
| $\Omega_3$. | Lesion |

What is claimed is:

1. A method for segmenting a first object from a bounding object within a digital image, comprising
   identifying, from within the digital image, a plurality of pixels between at least a first endpoint pixel and a second endpoint pixel, wherein the first and second endpoint pixels are identified by a user using a display;
   defining a volume of interest spanning at least a portion of the object according to the identified plurality of pixels;
   partitioning pixels within the volume of interest into a first subset of pixels that are neither the first object nor bounding object pixels and second subset of pixels that are not contained in the first subset;
   executing, by a computer processor, a spatially varying two-phase segmentation process that segments the first object from the bounding object within the second subset of pixels according to the location of each subject pixel within the second subset relative to pixels in the first subset of pixels;
   refining the first object segmentation according to the location of the subject pixel relative to the segmented bounding object and to the first subset of pixels;
   forming a segmented image according to the refined first object segmentation; and
   displaying, storing, or transmitting the segmented image.

2. The method of claim 1 wherein partitioning pixels into first and second subsets comprises thresholding.

3. The method of claim 2 wherein thresholding is performed according to predefined intensity values.

4. The method of claim 2 wherein thresholding is performed according to values of pixels within the volume of interest.

5. The method of claim 1 wherein partitioning pixels into first and second subsets comprises determining a boundary of an anatomical feature.

6. The method of claim 5 wherein determining the boundary comprises using segmentation of a bodily organ.

7. The method of claim 5 wherein the anatomical feature comprises a rib cage.

8. The method of claim 1 further comprising correcting for non-uniformity in the second subset prior to executing the spatially varying two-phase segmentation process.

9. The method of claim 1 further comprising correcting for non-uniformity in the second subset during execution of the spatially varying two-phase segmentation process.

10. The method of claim 1 further comprising correcting for non-uniformity in the second subset using a linear polynomial correction term.

11. The method of claim 1 wherein executing the spatially varying two-phase segmentation process comprises using a region-based, variational-segmentation model with spatially varying weights between a regularizer and a data term.

12. The method of claim 1 wherein executing the spatially varying two-phase segmentation process further comprises applying a weighting that varies according to the distance between the subject pixel and pixels in the first subset of pixels.

13. The method of claim 1 wherein defining the volume of interest comprises defining a spherical or elliptical region.

14. The method of claim 1 wherein refining the first object comprises using a predefined shape prior.

15. The method of claim 1 further comprising forming a class map according to the segmented image, wherein the class map defines two or more different portions of the digital image.

16. The method of claim 1 further comprising determining if the first object touches a surface defined by pixels in the first subset.

17. The method of claim 1 wherein refining comprises generating a parabolic boundary.

18. The method of claim 1 further comprising performing morphological processing using the class map.

19. A method for segmenting a lesion from bounding tissue in a 3-D volume image, comprising:

defining a volume of interest spanning at least a portion of the lesion according to user input that identifies, from within the volume image, at least a first endpoint voxel and a second endpoint voxel;

partitioning voxels within the region of interest into a first subset of voxels that are neither lesion nor bounding tissue voxels and second subset of voxels that are not contained in the first subset;

segmenting, by a computer processor, the lesion of the volume image from the bounding tissue by partitioning the second subset of voxels according to a spatially varying two-phase segmentation process, wherein, for each subject voxel within the second subset, one or more parameters of the spatially varying two phase segmentation process varies according to the location of the subject voxel relative to voxels in the first subset of voxels;

forming a segmented volume image according to the segmentation process; and displaying, storing, or transmitting the segmented volume image.

20. The method of claim 19 further comprising characterizing the lesion as either hyperdense or hypodense.

21. The method of claim 19 further comprising determining a boundary that limits leakage of the lesion in the image according to anatomy features.

22. The method of claim 19 further comprising using a predefined shape to constrain leakage of the lesion in the image.

23. The method of claim 19 further comprising refining the lesion segmentation according to voxel location within the segmented lesion relative to the segmented background and first subset of voxels.

* * * * *